(12) United States Patent
Yamamoto

(10) Patent No.: US 9,873,480 B2
(45) Date of Patent: Jan. 23, 2018

(54) BICYCLE DRIVE UNIT

(71) Applicant: Shimano Inc., Sakai, Osaka (JP)

(72) Inventor: Takashi Yamamoto, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 15/334,406

(22) Filed: Oct. 26, 2016

(65) Prior Publication Data

US 2017/0137085 A1 May 18, 2017

(30) Foreign Application Priority Data

Nov. 16, 2015 (JP) ................................. 2015-223961

(51) Int. Cl.
| | | |
|---|---|---|
| *B62M 6/55* | (2010.01) | |
| *B62M 6/45* | (2010.01) | |
| *B62M 11/18* | (2006.01) | |
| *F16H 3/66* | (2006.01) | |
| *F16H 37/06* | (2006.01) | |

(52) U.S. Cl.
CPC ................ *B62M 6/55* (2013.01); *B62M 6/45* (2013.01); *B62M 11/18* (2013.01); *F16H 3/666* (2013.01); *F16H 37/065* (2013.01); *F16H 2200/2007* (2013.01); *F16H 2200/2069* (2013.01)

(58) Field of Classification Search
None
See application file for complete search history.

(56) References Cited

U.S. PATENT DOCUMENTS

| | | | | |
|---|---|---|---|---|
| 8,100,208 B2* | 1/2012 | Jordan | ...................... | B62M 6/65 180/220 |
| 8,449,421 B2* | 5/2013 | Jung | ........................ | B62M 6/65 475/12 |
| 8,651,993 B1* | 2/2014 | Watarai | ..................... | B62M 6/55 475/205 |
| 8,777,791 B1* | 7/2014 | Hino | ........................ | B62M 6/55 180/206.4 |
| 9,802,673 B2* | 10/2017 | Hayslett | ................... | B62M 6/55 |

FOREIGN PATENT DOCUMENTS

| | | | | |
|---|---|---|---|---|
| CA | 2929418 A1 * | 11/2016 | ............. | B62M 6/55 |
| CA | 2933713 A1 * | 1/2017 | ............. | B62M 6/55 |
| JP | 2623419 B2 | 6/1997 | | |
| JP | 5201756 B2 | 6/2013 | | |

* cited by examiner

*Primary Examiner* — Dirk Wright
(74) *Attorney, Agent, or Firm* — Global IP Counselors, LLP

(57) ABSTRACT

A bicycle drive unit basically has a transmission, a motor and a resultant force member. The motor is configured to transmit rotation to the transmission, and a resultant force member to which rotation from the transmission and from the manual drive force is transmitted. The transmission has a first sun gear, a second sun gear, a first ring gear, a second ring gear, a first planetary gear, a second planetary gear and a third planetary gear. The first, second and third planetary gears are separate individual gears. The first planetary gear is engaged with the first sun gear and the first ring gear. The second planetary gear is engaged with the second sun gear and the third planetary gear. The third planetary gear is engaged with the second planetary gear and the second ring gear.

19 Claims, 5 Drawing Sheets

BICYCLE DRIVE UNIT

CROSS-REFERENCE TO RELATED APPLICATIONS

This application claims priority to Japanese Patent Application No. 2015-223961, filed on Nov. 16, 2015. The entire disclosure of Japanese Patent Application No. 2015-223961 is hereby incorporated herein by reference.

BACKGROUND

Field of the Invention

The present invention relates to a bicycle drive unit.

Background Information

Some bicycles are provided with a bicycle drive unit to assist the rider by generating an auxiliary drive force. A bicycle drive unit comprises a motor for assisting the manual drive force. In addition to the motor, the bicycle drive unit often further comprises a reduction gear that decelerates and outputs the rotation of the motor, a resultant force member to which rotation is transmitted from each of the reduction gear and a crankshaft, and the like. One example of such a conventional bicycle drive unit is disclosed in Japanese Patent No. 2,623,419.

SUMMARY

In a conventional bicycle drive unit, the rotational speed of the motor is proportional to the rotational speed of the crank. Since the motor has a characteristic in which the output torque varies according to the rotational speed, there is the risk that the output torque of the motor will be insufficient, thereby either reducing the assisting force, or reducing the driving efficiency of the motor, depending on the rotational speed of the crank.

One object of the present invention is to provide a bicycle drive unit that can suppress at least one of the reduction in the assisting force and the reduction in the driving efficiency of the motor, accompanying a change in the rotational speed of the crank.

In view of the state of the known technology and in accordance with a first aspect of the present disclosure, a bicycle drive unit according to the present invention comprises a transmission, a motor and a resultant force member. The motor is configured to transmit rotation to the transmission, and a resultant force member to which rotation from the transmission and from the manual drive force is transmitted. The transmission has a first sun gear, a second sun gear, a first ring gear, a second ring gear, a first planetary gear, a second planetary gear and a third planetary gear. The first, second and third planetary gears are separate individual gears. The first planetary gear is engaged with the first sun gear and the first ring gear. The second planetary gear is engaged with the second sun gear and the third planetary gear. The third planetary gear is engaged with the second planetary gear and the second ring gear.

According to one example of the bicycle drive unit, the resultant force member is provided around a rotational axis of a crankshaft, and is configured to be rotated around the rotational axis of the crankshaft.

One example of the bicycle drive unit further comprises a transmitting member configured to transmit rotation of the motor to the first sun gear and the second sun gear.

According to one example of the bicycle drive unit, the transmitting member further comprises an output shaft of the motor.

According to one example of the bicycle drive unit, the transmission further comprises a first one-way clutch and a second one-way clutch. The first one-way clutch is configured to transmit rotation of the transmitting member to the first sun gear while the transmitting member is rotated in a first rotational direction and uncouple the transmitting member from the first sun gear so as to not transmit rotation of the transmitting member to the first sun gear while the transmitting member is rotated in a second rotational direction. The second one-way clutch is configured to transmit rotation of the transmitting member to the second sun gear while the transmitting member is rotated in the second rotational direction and uncouple the transmitting member from the second sun gear so as to not transmit the rotation of the transmitting member to the second sun gear while the transmitting member is rotated in the first rotational direction.

According to one example of the bicycle drive unit, the first sun gear and the second sun gear can rotate around a common axis.

According to one example of the bicycle drive unit, the first ring gear and the second ring gear are integrally formed.

According to one example of the bicycle drive unit, a total number of teeth on the first ring gear and a total number of teeth on the second ring gear are equal.

According to one example of the bicycle drive unit, a total number of teeth on the first sun gear and a total number of teeth on the second sun gear are equal. A total number of teeth on the first planetary gears and a total number of teeth on the second planetary gears are different. A total number of teeth on the first planetary gears and a total number of teeth on the third planetary gears are different.

According to one example of the bicycle drive unit, the third planetary gears are arranged so that the entirety of the teeth on the third planetary gears mesh with the second ring gear in a direction along a rotational axis of the second sun gear.

According to one example of the bicycle drive unit, the second planetary gears are arranged so that the entirety of the teeth on the second planetary gear mesh with the third planetary gears in a direction along a rotational axis of the second sun gear.

According to one example of the bicycle drive unit, the first planetary gear is arranged closer to the motor than the second planetary gear and the third planetary gear with respect to a direction along a rotational axis of the first sun gear.

According to one example of the bicycle drive unit, the transmission further comprises a carrier that rotatably supports the first planetary gear, the second planetary gear and the third planetary gear. The resultant force member is coupled to the carrier.

One example of the bicycle drive unit further comprises a housing supporting the transmission. The first ring gear and the second ring gear are non-rotatable with respect to the housing.

One example of the bicycle drive unit further comprises a speed reducer configured to reduce a rotational output speed of the transmission and transmit the rotational output speed of the transmission to the resultant force member.

One embodiment of the bicycle apparatus further comprises a controller configured to the motor.

According to one example of the bicycle drive unit, the controller is configured to control the motor according to a manual drive force and a rotational speed of the crank.

According to one example of the bicycle drive unit, the controller is configured to control the motor so that the motor is rotated in a first direction while the rotational speed of the crank is less than a prescribed rotational speed, and control the motor so that the motor is rotated in a second direction while the rotational speed of the crank is greater than, or equal to, the prescribed rotational speed.

One example of the bicycle drive unit further comprises a crankshaft. The resultant force member is provided around a rotational axis of the crankshaft and is configured to be rotated around the rotational axis of the crankshaft.

According to the bicycle drive unit, it is possible to suppress at least one of the reduction in the assisting force and the reduction in the driving efficiency of the motor, accompanying a change in the rotational speed of the crank.

BRIEF DESCRIPTION OF THE DRAWINGS

Referring now to the attached drawings which form a part of this original disclosure.

DETAILED DESCRIPTION OF EMBODIMENTS

Figure 1:
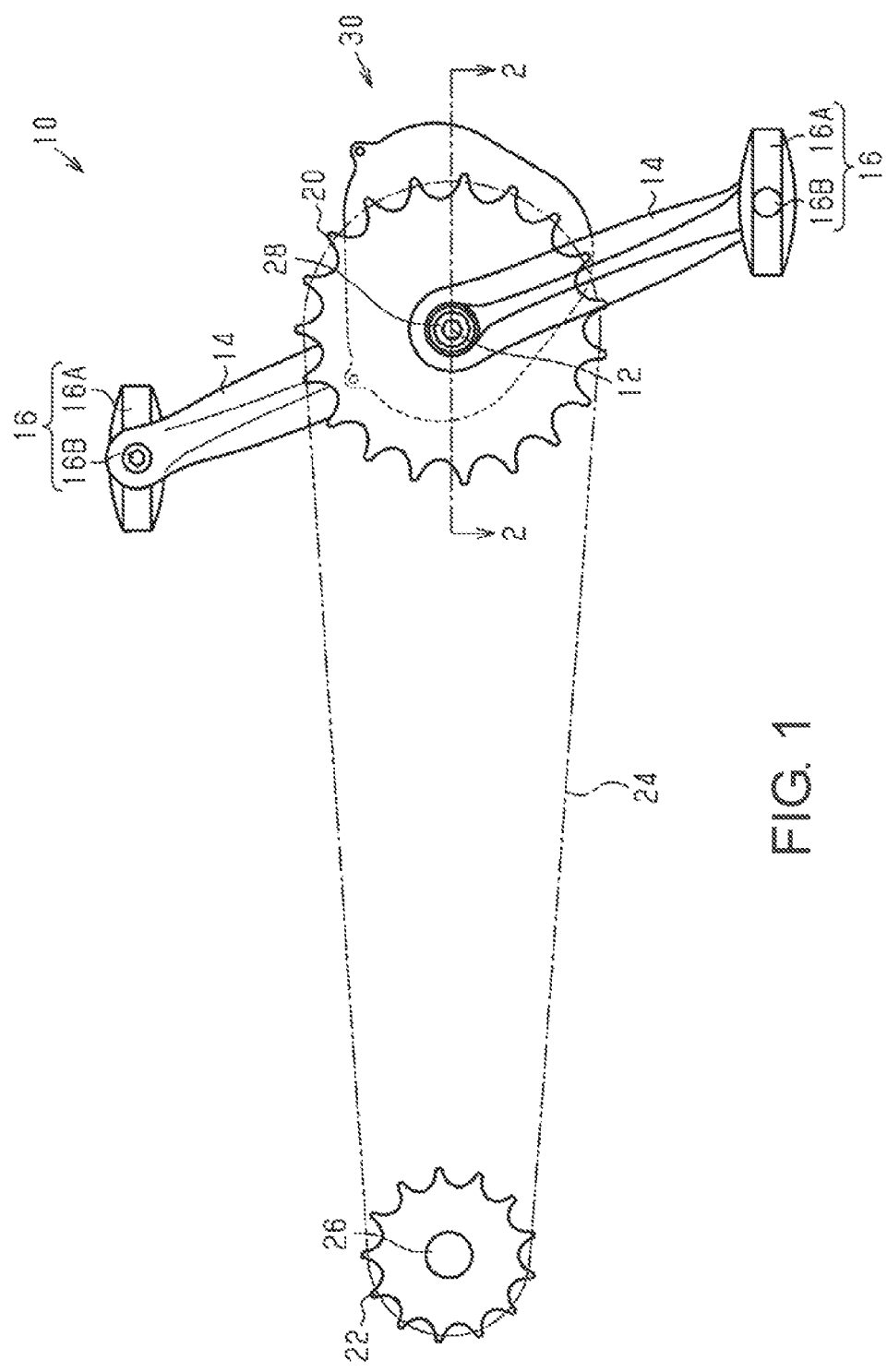
FIG. 1 is a side elevational view of a drivetrain of an electrically assisted bicycle equipped with a bicycle drive unit in accordance with a first embodiment.

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

An electrically assisted bicycle 10 shown in FIG. 1 comprises a bicycle drive unit (hereinafter referred to as "drive unit 30") in accordance with a first embodiment. In one example, the electrically assisted bicycle 10 further comprises a crankshaft 12, a pair of crank arms 14, a pair of pedals 16, a front sprocket 20, a rear sprocket 22, a chain 24 and a first clutch 26.

The crank arms 14 are coupled to the ends of the crankshaft 12 in a state of being integrally rotatable with the crankshaft 12 of the drive unit 30. The crank arms 14 form a crank together with the crankshaft 12. The pedals 16 each comprises a pedal main body 16A and a pedal shaft 16B. One of the pedal shafts 16B is coupled to each of the crank arms 14. The pedal main bodies 16A are supported on the pedal shafts 16B in a state of being rotatable with respect to the pedal shafts 16B.

Figure 2:
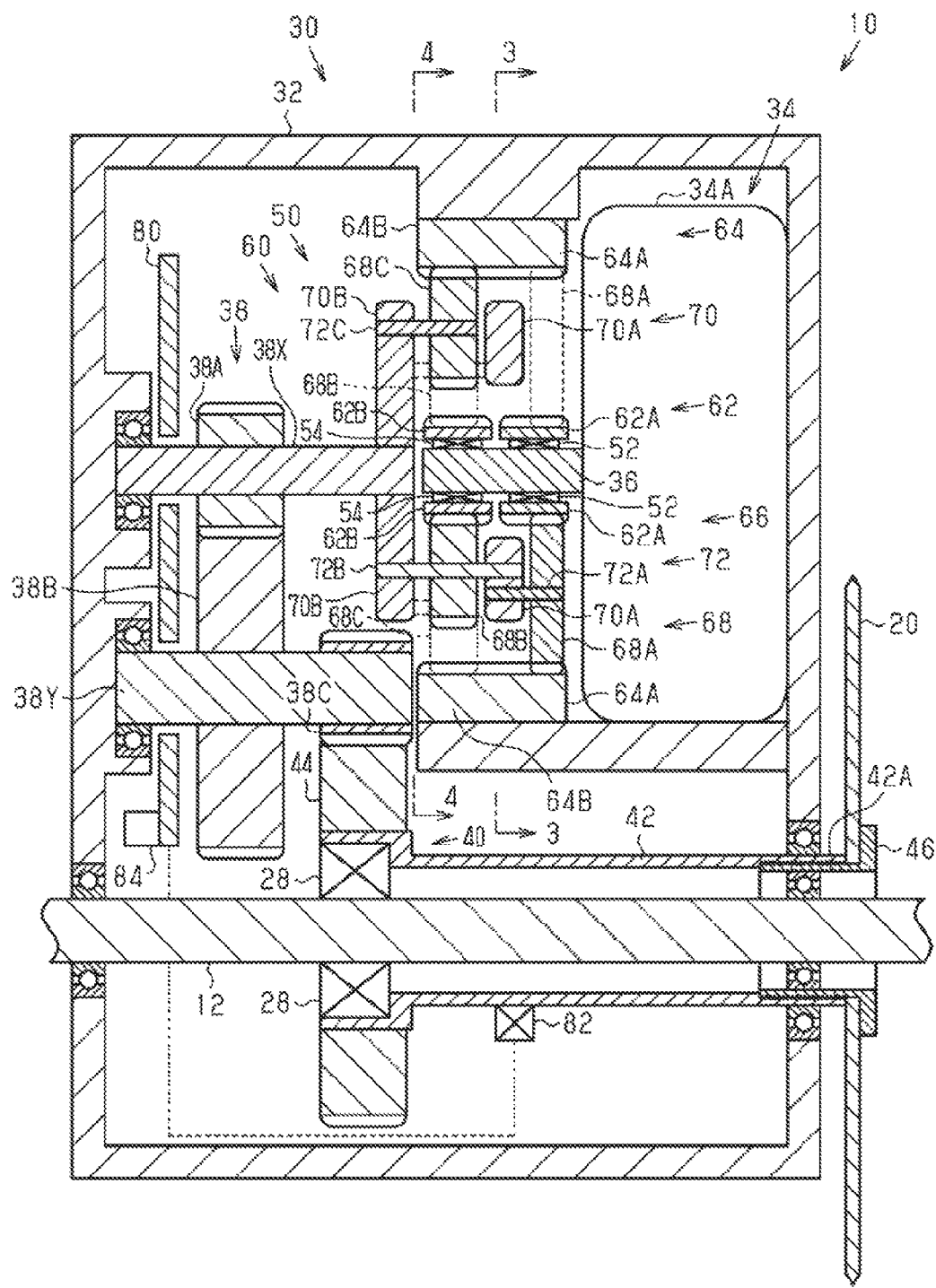
FIG. 2 is a cross-sectional view of the bicycle drive unit as seen along section line 2-2 in FIG. 1.

The front sprocket 20 is coupled with the drive unit 30 via a resultant force member 40 of the drive unit 30 (refer to FIG. 2). The rear sprocket 22 is coupled with a rear wheel (not shown) of the electrically assisted bicycle 10 via the first clutch 26. The chain 24 is engaged with the front sprocket 20 and the rear sprocket 22. The first clutch 26 is a one-way clutch.

The function of the drive unit 30 is to assist the manual drive force that is inputted to the crankshaft 12. The drive unit 30 is detachably mounted to a frame of the electrically assisted bicycle 10. An example of a means to join the drive unit 30 and the frame are bolts. A battery (not shown) is mounted to the frame of the electrically assisted bicycle 10. The battery (not shown) is configured to supply electrical energy to the drive unit 30.

As shown in FIG. 2, the drive unit 30 comprises a transmission 50 and a motor 34. One example of a motor 34 is an electric motor. In one example, the drive unit 30 further comprises the crankshaft 12, a housing 32, a transmitting member 36, a speed reducer 38 and the resultant force member 40. The motor 34, the transmitting member 36, the speed reducer 38 and the resultant force member 40 are arranged inside the housing 32.

The crankshaft 12 is supported by the drive unit 30 in a state of being rotatable with respect to the drive unit 30. The two ends of the crankshaft 12 protrude from the drive unit 30.

The transmitting member 36 comprises an output shaft of the motor 34. In one example, the transmitting member 36 is the output shaft of the motor 34. The motor 34 comprises an output shaft and a main body 34A. The main body 34A comprises a rotor and a stator (both not shown). The motor 34 is able to rotate the transmitting member 36 in a first rotational direction R1, as well as to a second rotational direction R2, which is opposite thereof (refer to FIG. 3). The rotational axis of the transmitting member 36 is parallel to a direction along the rotational axis of the crankshaft 12 (hereinafter referred to as the "first direction").

As shown in FIG. 2, the speed reducer 38 comprises a first shaft 38X, a second shaft 38Y, a first gear 38A, a second gear 38B, a third gear 38C and a gear 44. The rotational axis of the first shaft 38X and the rotational axis of the second shaft 38Y are parallel to the first direction. The first shaft 38X is provided coaxially with the transmitting member 36.

The motor 34 is configured to transmit rotation to the transmission 50. The transmitting member 36 is coupled to an input body 62 included in the transmission 50 and transmits the rotation of the rotor of the motor 34 to the transmission 50. A carrier 70 included in the transmission 50 is coupled to the first shaft 38X of the speed reducer 38. The third gear 38C of the speed reducer 38 meshes with the gear 44 of the speed reducer 38. The gear 44 is coupled to the resultant force member 40. The speed reducer 38 is configured to reduce the rotational speed transmitted from the transmission 50 and transmit the rotational speed from the transmission 50 to the resultant force member 40.

The rotation from the transmission 50 is transmitted, and the rotation by the manual drive force is transmitted, to the resultant force member 40. The resultant force member 40 comprises a hollow shaft 42. The hollow shaft 42 is rotatably supported on the housing 32 and the crankshaft 12 in a state of being rotatable with respect to the housing 32. The resultant force member 40 is provided around the rotational axis of the crankshaft 12. The resultant force member 40 is configured to be around the rotational axis of the crankshaft 12. One end 42A of the hollow shaft 42 protrudes from the housing 32. The crankshaft 12 is inserted in the hollow shaft 42 so that both ends protrude from the hollow shaft 42. The gear 44 is attached to the hollow shaft 42 in a state of being non-rotatable with respect to the hollow shaft 42. The gear 44 is arranged coaxially with the hollow shaft 42. In another example, the gear 44 can be integrally formed with the hollow shaft 42 during the formation of the hollow shaft 42.

The second clutch 28 is a one-way clutch. The second clutch 28 is provided between the outer perimeter of the crankshaft 12 and the inner perimeter of the resultant force member 40. The second clutch 28 transmits rotation from the crankshaft 12 to the resultant force member 40 while the crankshaft 12 is rotated forward. The second clutch 28 is uncoupled from the crankshaft 12 and the resultant force member 40 so as to not transmit rotation from the crankshaft 12 to the resultant force member 40 while the crankshaft 12 rotated rearward.

The front sprocket 20 is arranged on the side of the housing 32 and located outside of the housing 32. The front sprocket 20 is attached to the drive unit 30 by a bolt 46. The bolt 46 is threaded to the resultant force member 40 so that the front sprocket 20 is fixed between the bolt 46 and the resultant force member 40.

When a manual drive force is inputted to the pedals 16 in a forward direction to rotate the crankshaft 12 as shown in FIG. 1, the crankshaft 12 is also rotated forward with respect to the frame of the electrically assisted bicycle 10. In this case, the rotation of the crankshaft 12 is transmitted to the front sprocket 20 via the second clutch 28 and the resultant force member 40, and the rotation of the front sprocket 20 is transmitted to the rear sprocket 22 via the chain 24.

When a manual drive force is inputted to the pedals 16 in a rearward direction to rotate the crankshaft 12, the crankshaft 12 is also rotated rearward with respect to the frame. In this case, however, the rotation of the crankshaft 12 is not transmitted to the resultant force member 40 and the front sprocket 20 through the action of the second clutch 28.

As shown in FIG. 2, the transmission 50 is provided in the housing 32. The transmission 50 comprises a planetary gear mechanism 60, a first one-way clutch 52 and a second one-way clutch 54. The position in which the transmission 50 is disposed in the first direction is between the main body 34A of the motor 34 and the speed reducer 38. The planetary gear mechanism 60 comprises an input body 62, a transmission body 64 and an output body 66. The transmission 50 comprises a first sun gear 62A, a second sun gear 62B, a plurality of first planetary gears 68A, a plurality of second planetary gears 68B, a plurality of third planetary gears 68C, a first ring gear 64A and a second ring gear 64B, and a carrier 70. The first, second and third planetary gears 68A, 68B and 68C are separate individual gears.

The input body 62 comprises the first sun gear 62A and the second sun gear 62B, which are each individually configured as separate individual gears. The first sun gear 62A and the second sun gear 62B are rotatable around the same rotational axis. Each of the sun gears 62A and 62B is disposed around the transmitting member 36 in a state of being rotatable with respect to the transmitting member 36. Each of the sun gears 62A and 62B is provided coaxially with the transmitting member 36. The total number of teeth on the first sun gear 62A and the total number of teeth on the second sun gear 62B are equal. In another example, the total number of teeth of the first sun gear 62A and the total number of teeth of the second sun gear 62B can be different. The transmitting member 36 is a member for transmitting the rotation of the motor 34 to the first sun gear 62A and the second sun gear 62B.

The sun gears 62A and 62B are disposed side-by-side in the first direction. In one example, the first sun gear 62A is provided in a position closer to the main body 34A of the motor 34 than the second sun gear 62B with respect to the first direction. In another example, the first sun gear 62A can be provided in a position farther from the main body 34A of the motor 34 than the second sun gear 62B with respect to the first direction.

The first one-way clutch 52 is provided between the outer perimeter of the transmitting member 36 and the inner perimeter of the first sun gear 62A. The first one-way clutch 52 transmits rotation from the transmitting member 36 to the first sun gear 62A while the transmitting member 36 is rotated in a first rotational direction R1 (refer to FIG. 3). The first one-way clutch 52 uncouples the transmitting member 36 from the first sun gear 62A so as to not transmit rotation from the transmitting member 36 to the first sun gear 62A while the transmitting member 36 is rotated in a second rotational direction R2 (refer to FIG. 3). The first one-way clutch 52 can be a roller clutch or can be a pawl clutch.

The second one-way clutch 54 is provided between the outer perimeter of the transmitting member 36 and the inner perimeter of the second sun gear 62B. The second one-way clutch 54 transmits rotation from the transmitting member 36 to the second sun gear 62B while the transmitting member 36 is rotated in the second rotational direction R2 (refer to FIG. 4). The second one-way clutch 54 uncouples the transmitting member 36 from the second sun gear 62B so as to not transmit rotation from the transmitting member 36 to the second sun gear 62B while the transmitting member 36 is rotated in the first rotational direction R1 (refer to FIG. 4). The second one-way clutch 54 can be a roller clutch or can be a pawl clutch.

The transmission body 64 comprises the first ring gear 64A and the second ring gear 64B. The total number of teeth on the first ring gear 64A and the total number of teeth on the second ring gear 64B are equal. In another example, the total number of teeth on the first ring gear 64A and the total number of teeth on the second ring gear 64B can be different. The first ring gear 64A and the second ring gear 64B are integrally formed as a one-piece member. In another example, the first ring gear 64A and the second ring gear 64B are formed separately.

The first ring gear 64A and the second ring gear 64B are non-rotatable with respect to the housing 32. Each of the ring gears 64A and 64B is disposed around the transmitting member 36 in a state of being non-rotatable around the rotational axis of the transmitting member 36. Each of the ring gears 64A and 64B is provided coaxially with the transmitting member 36. In one example, each of the ring gears 64A and 64B is fixed to the housing 32. Each of the ring gears 64A and 64B is disposed in the first direction. In one example, the first ring gear 64A is provided in a position closer to the main body 34A of the motor 34 than the second ring gear 64B with respect to the first direction. In another example, the first ring gear 64A can be provided in a position farther from the main body 34A of the motor 34 than the second ring gear 64B with respect to the first direction.

The output body 66 comprises a plurality of planetary gears 68, a plurality of carriers 70, and a plurality of planetary pins 72. The planetary gears 68 comprises a plurality of first planetary gears 68A, a plurality of second planetary gears 68B and a plurality of third planetary gears 68C which are individually configured as separate individual gears. In one example, the number of each of the pinion gears 68A, 68B and 68C included in the output body 66 is three. In another example, the number of each of the pinion gears 68A, 68B and 68C included in the output body 66 can be one or any multiple of gears.

The total number of teeth on the first planetary gears 68A are different from the total number of teeth on the second planetary gears 68B and the third planetary gears 68C. The total number of teeth on the first planetary gears 68A is greater than the total number of teeth on the second planetary gears 68B and the total number of teeth on the third planetary gears 68C. In one example, the total number of teeth on the second planetary gears 68B and the total number on teeth of the third planetary gears 68C are equal. In another example, the total number of teeth on the second planetary gears 68B and the total number of teeth on the third planetary gears 68C can be different.

Each of the planetary gears 68A, 68B, and 68C is disposed around the transmitting member 36 in a state of being configured to revolve with respect to the transmitting member 36. Each of the planetary gears 68A, 68B and 68C is disposed between the input body 62 and the transmission body 64 in a direction that is perpendicular to the first direction (hereinafter referred to as the "second direction").

The first planetary gears 68A are arranged closer to the motor 34 than the second planetary gears 68B and the third planetary gears 68C with respect to a direction along the rotational axis of the first sun gear 62A. In another example, the first planetary gears 68A can be provided in a position farther from the main body 34A of the motor 34 than the second planetary gears 68B and the third planetary gears 68C with respect to the first direction.

The first planetary gears 68A engage the first sun gear 62A and the first ring gear 64A. The first planetary gears 68A are arranged so that the entirety of the teeth on the first planetary gears mesh with the teeth of the first sun gear 62A and the first ring gear 64A with respect to a direction along the rotational axis of the first sun gear 62A.

The second planetary gears 68B engage the second sun gear 62B and the third planetary gears 68C. The second planetary gears 68B do not engage the second ring gear 64B. The second planetary gears 68B are arranged so that the entirety of the teeth on the second planetary gears mesh with the teeth of the second sun gear 62B and the third planetary gears 68C with respect to a direction along the rotational axis of the second sun gear 62B.

The third planetary gears 68C engage the second ring gear 64B and the second planetary gears 68B. The third planetary gears 68C do not engage the second sun gear 62B. The third planetary gears 68C are arranged so that the entirety of the teeth on the third planetary gears mesh with the second ring gear 64B with respect to a direction along the rotational axis of the second sun gear 62B.

The carriers 70 comprise a first carrier 70A and a second carrier 70B. The first carrier 70A and the second carrier 70B are individually configured as separate carriers. The first carrier 70A is fixed to the second carrier 70B. The first carrier 70A and the second carrier 70B can be integrally formed as well. Each of the carriers 70A and 70B is disposed around the transmitting member 36 in a state of being rotatable with respect to the transmitting member 36. Each of the carriers 70A and 70B is provided coaxially with the transmitting member 36. The carrier 70 rotatably supports the first planetary gears 68A, the second planetary gears 68B and the third planetary gears 68C.

The first carrier 70A and the second carrier 70B are arranged side-by-side in the first direction. The first carrier 70A is provided between the first planetary gears 68A and the second planetary gears 68B, as well as the third planetary gears 68C with respect to the first direction. The second carrier 70B is provided further on the side with the speed reducer 38 than the second planetary gears 68B and the third planetary gears 68C in the first direction. The second carrier 701 is coupled to the first shaft 38X so as to be integrally rotatable with the first shaft 38X of the speed reducer 38.

The planetary pins 72 comprise a plurality of first planetary pins 72A, a plurality of second planetary pins 72B and a plurality of third planetary pins 72C. The first planetary pins 72A are coupled with the first carrier 70A and support the first planetary gears 68A. The first planetary gears 68A are provided coaxially with the first planetary pins 72A.

The second planetary pins 72B couple the first carrier 70A and the second carrier 70B, and support the second planetary gears 68B. The second planetary gears 68B are provided coaxially with the second planetary pins 7213B.

The third planetary pins 72C couples the first carrier 70A and the second carrier 70B and supports the third planetary gears 68C' The third planetary gears 68C are provided coaxially with the third planetary pins 72C.

The connecting structure of the planetary gears 68, the carriers 70 and the planetary pins 72 can take one of a plurality of configurations. In the first embodiment, the planetary pins 72 are rotatable with respect to the carriers 70 and the planetary gears 68 are non-rotatable with respect to the planetary pins 72. In the second embodiment, the planetary pins 72 are non-rotatable with respect to the carriers 70 and the planetary gears 68 are rotatable with respect to the planetary pins 72. In the third embodiment, the planetary pins 72 are rotatable with respect to the carriers 70 and the planetary gears 68 are rotatable with respect to the planetary pins 72.

Figure 3:
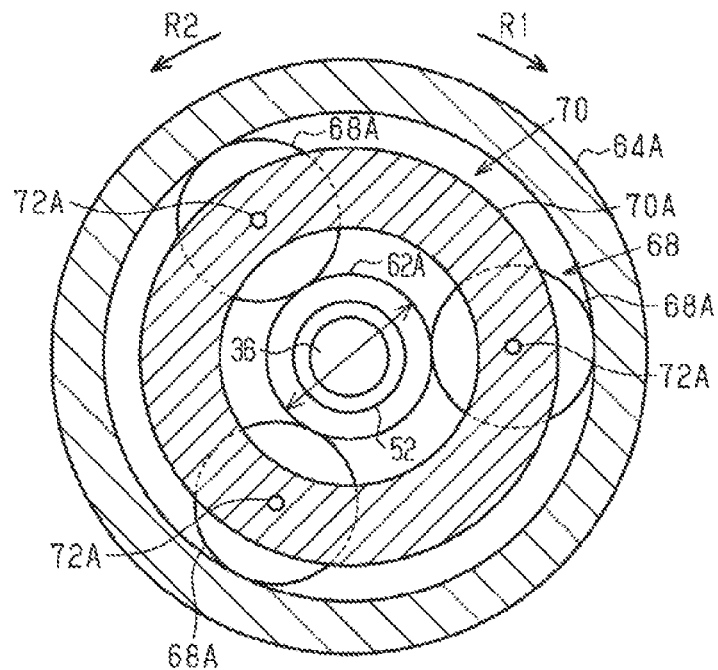
FIG. 3 is a cross-sectional view of the bicycle drive unit as seen along section line 3-3 in FIG. 2.

FIG. 3 shows the relationship between the first sun gear 62A, the first planetary gears 68A, the first ring gear 64A, and the like. The first one-way clutch 52 transmits the rotation of the transmitting member 36 to the first sun gear 62A while the transmitting member 36 is rotated in the first rotational direction R1. The first one-way clutch 52 uncouples the transmitting member 36 from the first sun gear 62A so as to not transmit the rotation of the transmitting member 36 to the first sun gear 62A while the transmitting member 36 is rotated in the second rotational direction R2, which is opposite of the first rotational direction R1. Accordingly, while the transmitting member 36 is rotated in the first rotational direction R1, the rotation of the transmitting member 36 is transmitted to the speed reducer 38 via the first sun gear 62A, the first planetary gears 68A, and the carrier 70.

Figure 4:
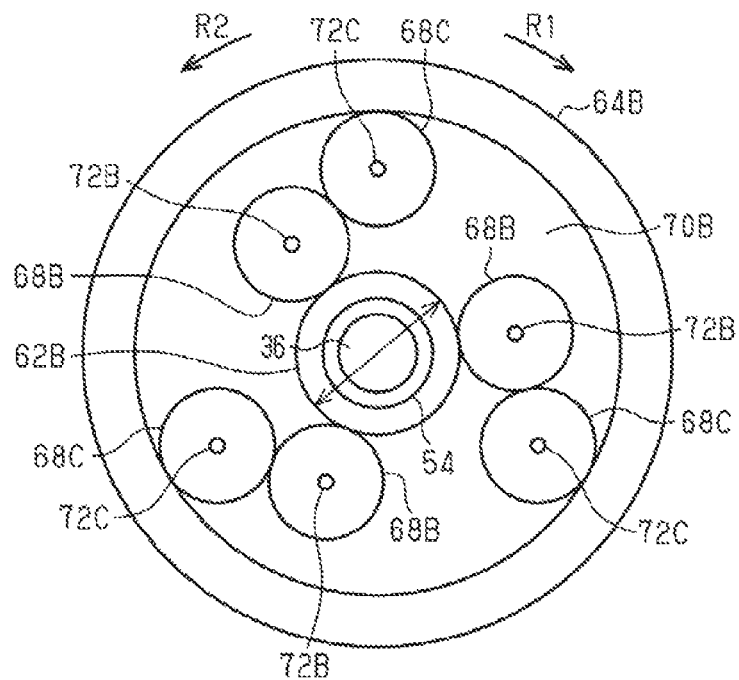
FIG. 4 is a cross-sectional view of the bicycle drive unit as seen along section line 4-4 in FIG. 2.

FIG. 4 shows the relationship between the second sun gear 62B, the second planetary gears 68B, the third planetary gears 68C, the second ring gear 64B, and the like. The second one-way clutch 54 transmits the rotation of the transmitting member 36 to the second sun gear 62B while the transmitting member 36 is rotated in the second rotational direction R2. The second one-way clutch 54 uncouples the transmitting member 36 from the second sun gear 62B so as to not transmit the rotation of the transmitting member 36 to the second sun gear 62B while the transmitting member 36 is rotated in the first rotational direction R1. Accordingly, while the transmitting member 36 is rotated in the second rotational direction R2, the rotation of the transmitting member 36 is transmitted to the speed reducer 38 via the second sun gear 62B, the second planetary gears 68B, the third planetary gears 68C and the carrier 70.

The planetary gear mechanism 60 comprises a plurality of gear ratios. The gear ratio is the rotational speed of the output body 66 relative to the rotational speed of the input body 62. The gear ratios comprise a first gear ratio and a second gear ratio. The first gear ratio is a gear ratio that is obtained while the rotational speed of the transmitting member 36 is reduced by the first sun gear 62A, the first ring gear 64A and the first planetary gears 68A. The second gear ratio is a gear ratio that is obtained while the rotational speed of the transmitting member 36 is reduced by the second sun gear 62B, the second ring gear 64B, the second planetary gears 68B, and the third planetary gears 68C. The second gear ratio is greater than the first gear ratio.

As shown in FIG. 2, the first gear 38A is provided on the first shaft 38X in a state of being non-rotatable with respect to the first shaft 38X, and is provided coaxially with the first shaft 38X. In another example, the first gear 38A can be integrally formed with the first shaft 38X. The first shaft 38X is rotatably supported in the housing 32 via one or more bearings.

The second gear 38B is provided on the second shaft 38Y in a state of being non-rotatable with respect to the second shaft 38Y, and is provided coaxially with the second shaft 38Y. In another example, the second gear 38B can be integrally formed with the second shaft 38Y. The second gear 38B is engaged with the first gear 38A. The number of teeth of the first gear 38A is less than the number of teeth of the second gear 38B. The second shaft 38Y is rotatably supported to the housing 32 via one or more bearings.

The third gear 38C is provided on the second shaft 38Y in a state of being non-rotatable with respect to the second shaft 38Y, and is provided coaxially with the second shaft 38Y. In another example, the third gear 38C can be integrally formed with the second shaft 38Y, and can be integrally formed with the second gear 38B. The third gear 38C is engaged with the gear 44. The total number of teeth on the third gear 38C is less than the total number of teeth on the second gear 38B, and less than the total number of teeth on the gear 44. In this manner, the resultant force member 40 is coupled with the carrier 70 via the speed reducer 38.

Figure 5:
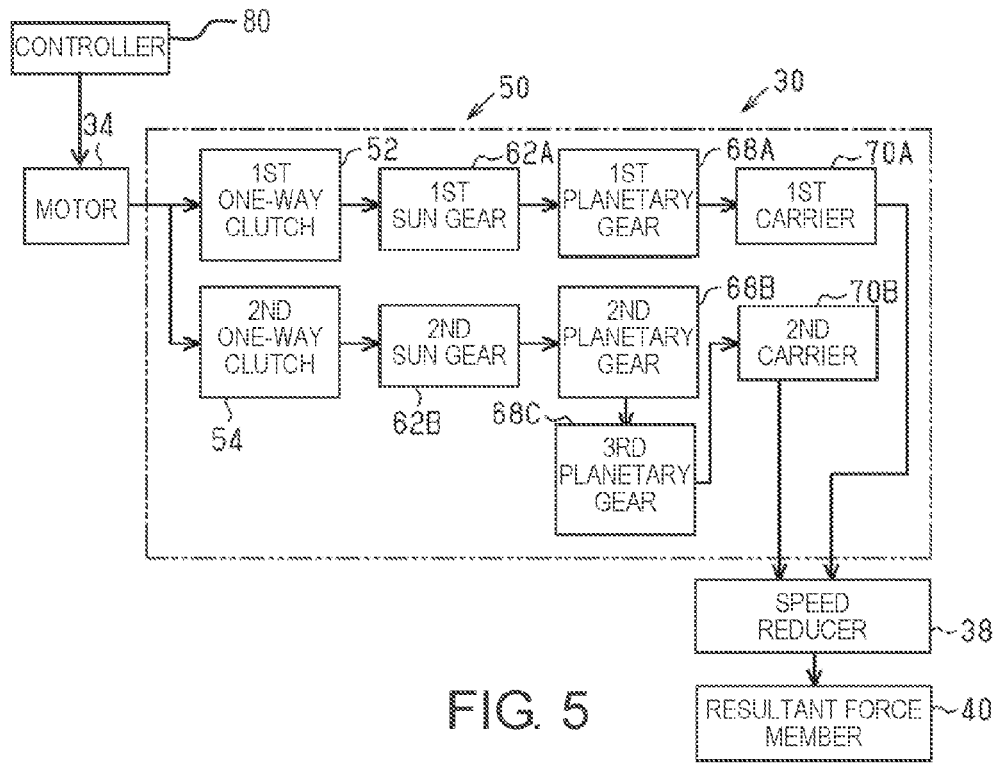
FIG. 5 is a block diagram of the transmission of FIG. 2.

FIG. 5 is a block diagram that shows the power transmission paths provided to the drive unit 30. The power transmission path is a path through which the torque of the motor 34 is transmitted from the motor 34 to the resultant force member 40. The drive unit 30 comprises a first power transmission path and a second power transmission path.

The first power transmission path is a path for transmitting the torque in the order of the motor 34, the first one-way clutch 52, the first sun gear 62A, the first planetary gears 68A, the first carrier 70A, the second carrier 70B, the speed reducer 38, and the resultant force member 40. The second power transmission path is a path for transmitting the torque in the order of the motor 34, the second one-way clutch 54, the second sun gear 62B, the second planetary gears 68B, the third planetary gears 68C, the second carrier 70B, the speed reducer 38, and the resultant force member 40.

The power transmission path that transmits the torque of the motor 34 to the resultant force member 40 is switched between the first power transmission path and the second power transmission path according to the rotational direction of the motor 34. While the motor 34 is rotated in the first rotational direction R1, the first one-way clutch 52 transmits the rotation of the transmitting member 36 to the first sun gear 62A. Therefore, the torque of the motor 34 is transmitted to the resultant force member 40 by the first power transmission path. While the motor 34 is rotated in the second rotational direction R2, the second one-way clutch 54 transmits the rotation of the transmitting member 36 to the second sun gear 62B; therefore, the torque of the motor 34 is transmitted to the resultant force member 40 by the second power transmission path.

As shown in FIG. 2, the drive unit 30 further comprises a controller 80, a torque sensor 82 and a rotational speed sensor (not shown). The controller 80 is programmed to execute a control program that is set in advance. The controller 80 comprises a processor, for example, a CPU (Central Processing Unit) or an MPU (Micro Processing Unit). The controller 80 preferably includes a memory device for storing programs and data. The torque sensor 82 is, for example a strain gauge, a semiconductor strain sensor, or a magnetostrictive sensor. The torque sensor 82 is attached to the hollow shaft 42 of the resultant force member 40. The torque sensor 82 detects the torque that is applied to the resultant force member 40.

When the rotation of the crankshaft 12 is transmitted to the resultant force member 40 and the rotation of the motor 34 is not transmitted to the resultant force member 40, the torque sensor 82 outputs a signal to the controller 80. This signal reflects the manual drive force that is inputted to the crankshaft 12 to the controller 80. When the rotation of the crankshaft 12 and the rotation of the motor 34 are transmitted to the resultant force member 40, the torque sensor 82 outputs a signal that reflects the torque obtained by combining the manual drive force that is inputted to the crankshaft 12 and the torque of the motor 34, which is amplified by the transmission 50 and the speed reducer 38.

The rotational speed sensor comprises a cadence sensor 84 that detects the rotational speed of the crank. The cadence sensor 84 detects, for example, a magnet that is provided on the crankshaft 12. The cadence sensor 84 comprises a magnetism detection sensor, such as a reed switch or a Hall Effect element. The cadence sensor 84 can also be configured to detect a magnet that is provided on the crank arm 14. The rotational speed sensor can further comprise a speed sensor that detects the rotational speed of the front wheel or the rear wheel of the electrically assisted bicycle 10. The controller 80 calculates the rotational speed of the crankshaft 12 based on the detection result of the rotational speed sensor.

The controller 80 is programmed to control the motor 34 according to the manual drive force and the rotational speed of the crank. In one example, the controller 80 controls the output of the motor 34 based on the manual drive force that is detected by the torque sensor 82, and the travel speed of the electrically assisted bicycle 10 that is detected by the rotational speed sensor.

The controller 80 further is programmed to control the rotational direction of the motor 34 based on the rotational speed of the crankshaft 12 that is detected by a rotational speed sensor. In one example, the controller 80 controls the rotational direction of the motor 34 based on the relationship between the rotational speed of the crankshaft 12 and a prescribed rotational speed that is set in advance.

The controller 80 controls the motor 34 so that the motor 34 rotates in the first rotational direction R1 while the rotational speed of the crank is less than a prescribed rotational speed, and controls the motor 34 so that the motor 34 rotates in the second rotational direction R2 while the rotational speed of the crank is greater than, or equal to, the prescribed rotational speed. The controller 80 comprises a memory that stores information related to a prescribed rotational speed. The information related to a prescribed rotational speed can be adjusted by an external device, such as a personal computer. The controller 80 can be configured to stop the motor 34 while the travel speed of the electrically assisted bicycle 10 becomes greater than, or equal to, a prescribed speed.

According to the first embodiment, the following actions and effects are obtained.

(1) In the drive unit 30, the transmission 50 is configured to shift the rotation from the motor 34 to either a first gear ratio or a second gear ratio and adding the same to the rotation of the manual drive force. Accordingly, it is possible to suppress at least one of the reduction in the assisting force and the reduction in the driving efficiency of the motor, accompanying a change in the rotational speed of the crank.

(2) The controller 80 switches the gear ratio of the transmission 50 by switching the rotational direction of the motor 34; therefore, the configuration is less likely to become complex, compared to a configuration in which the gear ratio is switched by switching a physical connection state.

Second Embodiment

Figure 6:
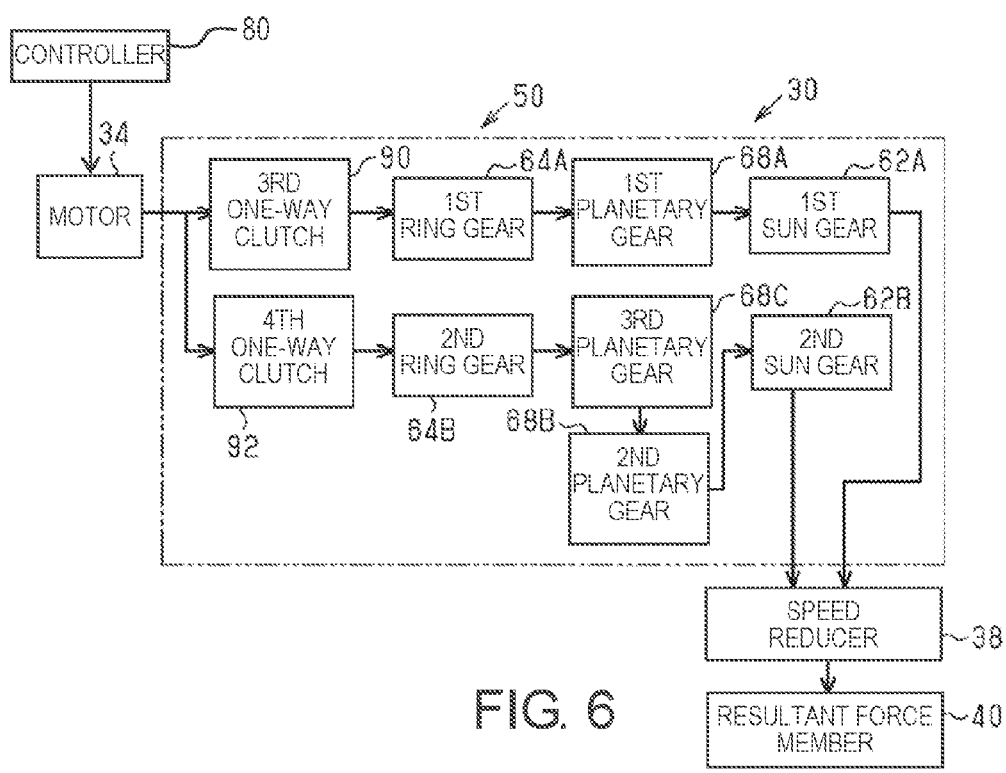
FIG. 6 is a block diagram of the transmission in accordance with a second embodiment.

FIG. 6 is a block diagram showing the power transmission paths provided to the drive unit 30 of a second embodiment. The drive unit 30 of the second embodiment differs from the drive unit 30 of the first embodiment as explained below. Otherwise, the drive unit 30 of the second embodiment has substantially the same configuration as the drive unit 30 of the first embodiment in all of the other aspects.

The input body 62 comprises a first ring gear 64A and a second ring gear 64B, which are each individually configured. The drive unit 30 comprises a third one-way clutch 90 and a fourth one-way clutch 92, instead of the first one-way clutch 52 and the second one-way clutch 54. The transmitting member 36 is coupled with each of the ring gears 64A and 64B via the one-way clutches 90 and 92.

The third one-way clutch 90 is provided between the outer perimeter of the transmitting member 36 and the outer perimeter of the first ring gear 64A. The third one-way clutch 90 transmits rotation from the transmitting member 36 to the first ring gear 64A while the transmitting member 36 is rotated in a first rotational direction R1. The third one-way clutch 90 uncouples the transmitting member 36 from the first ring gear 64A so as to not transmit rotation from the transmitting member 36 to the first ring gear 64A while the transmitting member 36 is rotated in a second rotational direction R2.

The fourth one-way clutch 92 is provided between the outer perimeter of the transmitting member 36 and the outer perimeter of the second ring gear 64B. The fourth one-way clutch 92 transmits rotation from the transmitting member 36 to the second ring gear 64B while the transmitting member 36 is rotated in the second rotational direction R2. The fourth one-way clutch 92 uncouples the transmitting member 36 from the second ring gear 64B so as to not transmit rotation from the transmitting member 36 to the second ring gear 64B while the transmitting member 36 is rotated in the first rotational direction R1.

The transmission body 64 comprises a plurality of planetary gears 68, a plurality of carriers 70 and a plurality of planetary pins 72. The carriers 70 are disposed around the transmitting member 36 in a state of being rotatable with respect to the housing 32 and the transmitting member 36. The carriers 70 are provided coaxially with the transmitting member 36. In one example, the carriers 70 are fixed to the housing 32.

The output body 66 comprises the first sun gear 62A and the second sun gear 62B. Each of the sun gears 62A and 62I is coupled with the first shaft 38X in a state of being non-rotatable with respect to the first shaft 38X. Each of the sun gears 62A and 62B is provided coaxially with the first shaft 38X.

The drive unit 30 comprises a third power transmission path and a fourth power transmission path. The third power transmission path is a path for transmitting the torque in the order of the motor 34, the third one-way clutch 90, the first ring gear 64A, the first planetary gears 68A, the first sun gear 62A, the speed reducer 38 and the resultant force member 40. The fourth power transmission path is a path for transmitting the torque in the order of the motor 34, the fourth one-way clutch 92, the second ring gear 64B, the third planetary gears 68C, the second planetary gears 68B, the second sun gear 62B, the speed reducer 38 and the resultant force member 40.

The power transmission path that transmits the torque of the motor 34 to the resultant force member 40 is switched between the third power transmission path and the fourth power transmission path according to the rotational direction of the motor 34. When the motor 34 is rotated in the first rotational direction R1, the third one-way clutch 90 transmits the rotation of the transmitting member 36 to the first ring gear 64A; therefore, the torque of the motor 34 is transmitted to the resultant force member 40 by the third power transmission path.

When the motor 34 is rotated in the second rotational direction R2, the fourth one-way clutch 92 transmits the rotation of the transmitting member 36 to the second ring gear 64B; therefore, the torque of the motor 34 is transmitted to the resultant force member 40 by the fourth power transmission path. According to the second embodiment, the same effects as (1) and (2) of the first embodiment are obtained.

Third Embodiment

Figure 7:
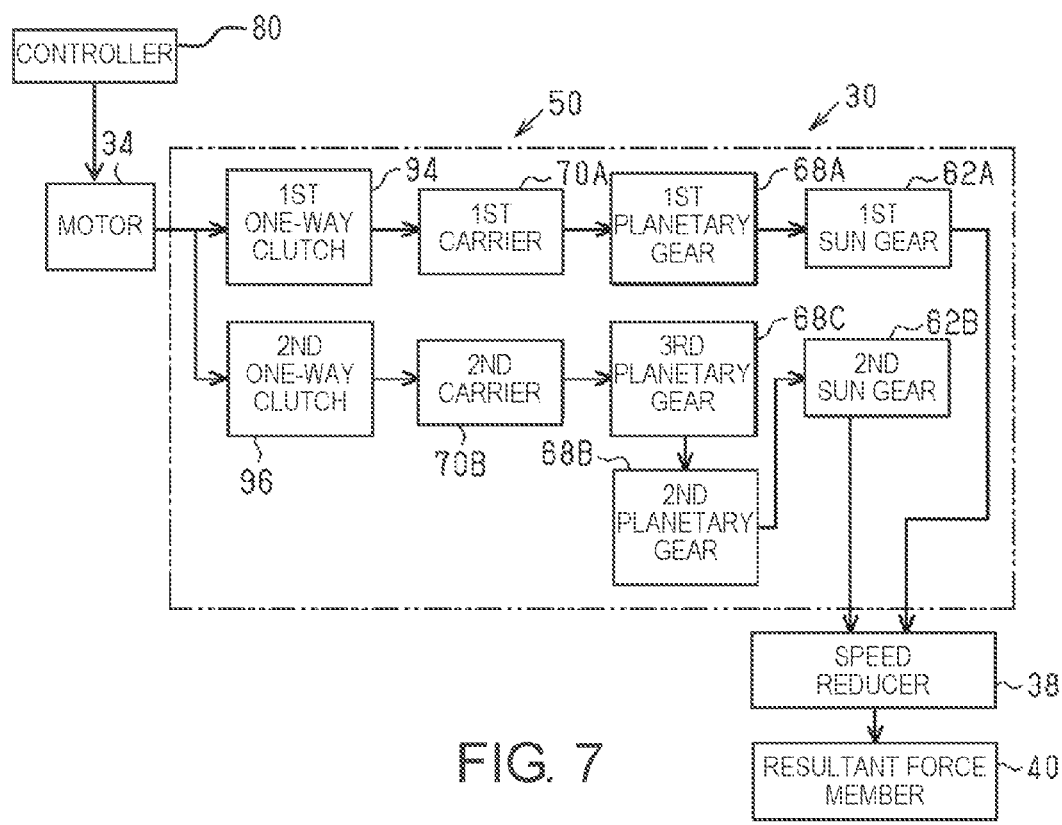
FIG. 7 is a block diagram of the transmission in accordance with a third embodiment.

FIG. 7 is a block diagram showing the power transmission paths provided to the drive unit 30 of a third embodiment. The drive unit 30 of the third embodiment differs from the drive unit 30 of the first embodiment as explained below. Otherwise, the drive unit 30 of the second embodiment has substantially the same configuration as the drive unit 30 of the first embodiment in all of the other aspects.

The input body 62 comprises a first carrier 70A and a second carrier 70B, which are each individually configured. The transmission body 64 comprises planetary gears 68 and planetary pins 72. The second planetary pins 72B and the third planetary pins 72C are coupled with the second carrier 70B and are not coupled with the first carrier 70A. That is, the first carrier 70A and the second carrier 70B are relatively rotatable.

The drive unit 30 comprises a fifth one-way clutch 94 and a sixth one-way clutch 96, instead of the first one-way clutch 52 and the second one-way clutch 54. The transmitting member 36 is coupled with each of the ring gears 64A and 64B via the one-way clutches 94 and 96.

The fifth one-way clutch 94 is provided between the outer perimeter of the transmitting member 36 and the inner perimeter of the first carrier 70A. The fifth one-way clutch 94 transmits rotation from the transmitting member 36 to the first carrier 70A while the transmitting member 36 is rotated in a first rotational direction R1. The fifth one-way clutch 94 uncouples the transmitting member 36 from the first carrier 70A so as to not transmit rotation from the transmitting member 36 to the first carrier 70A while the transmitting member 36 is rotated in a second rotational direction R2.

The sixth one-way clutch 96 is provided between the outer perimeter of the transmitting member 36 and the inner perimeter of the second carrier 70B. The sixth one-way clutch 96 transmits rotation from the transmitting member 36 to the second carrier 70B while the transmitting member 36 is rotated in the second rotational direction R2. The sixth one-way clutch 96 uncouples the transmitting member 36 from the second carrier 70B so as to not transmit rotation from the transmitting member 36 to the second carrier 70B while the transmitting member 36 is rotated in the first rotational direction R1.

The output body 66 comprises the first sun gear 62A and the second sun gear 62B. Each of the sun gears 62A and 62B is coupled with the first shaft 38X in a state of being rotatable with respect to the first shaft 38X. Each of the sun gears 62A and 62B is provided coaxially with the first shaft 38X.

The drive unit 30 comprises a fifth power transmission path and a sixth power transmission path. The fifth power transmission path is a path for transmitting the torque in the order of the motor 34, the fifth one-way clutch 94, the first carrier 70A, the first planetary gears 68A, the first sun gear 62A, the speed reducer 38 and the resultant force member 40. The sixth power transmission path is a path for transmitting the torque in the order of the motor 34, the sixth one-way clutch 96, the second carrier 70B, the third planetary gears 68C, the second planetary gears 68B, the second sun gear 62B, the speed reducer 38 and the resultant force member 40.

The power transmission path that transmits the torque of the motor 34 to the resultant force member 40 is switched between the fifth power transmission path and the sixth power transmission path according to the rotational direction of the motor 34. When the motor 34 is rotated in the first rotational direction R1, the fifth one-way clutch 94 transmits the rotation of the transmitting member 36 to the first carrier 70A. Therefore, the torque of the motor 34 is transmitted to the resultant force member 40 by the fifth power transmission path.

When the motor 34 is rotated in the second rotational direction R2, the sixth one-way clutch 96 transmits the rotation of the transmitting member 36 to the second carrier 70B; therefore, the torque of the motor 34 is transmitted to the resultant force member 40 by the sixth power transmission path. According to the third embodiment, the same effects as (1) and (2) of the first embodiment are obtained.

Modifications

The descriptions relating to each embodiment described above are examples of forms that the bicycle drive unit according to the present invention can take, and are not intended to limit the forms thereof. The bicycle drive unit according to the present invention can take the forms of the modifications of the above-described embodiments discussed below, as well as forms that combine at least two modifications that are not mutually contradictory.

The drive unit 30 of the embodiments can take a form that does not comprise the crankshaft 12. In this case, a crankshaft 12 as a component of the electrically assisted bicycle 10 is provided to the drive unit 30.

The total number of teeth of each planetary gear 68A, 68B, and 68C can be freely changed. In one example, the total number of teeth on the first planetary gear 68A, the total number of teeth on the second planetary gear 68B, and the total number of teeth on the third planetary gear 68C are equal. In this case, the total number of teeth on the second ring gear 64B is greater than the total number of teeth on the first ring gear 64A.

The input body 62 and the output body 66 of the planetary gear mechanism 60 can be freely changed. Any two of a sun gear, a ring gear, and a carrier 70 can be configured as the input body 62 and the output body 66 in any combination.

The position in which the drive unit 30 is provided can be freely changed. In one example, the drive unit 30 can be provided in the vicinity of the rear sprocket 22. In this case, it is possible to configure the rear wheel hub shell as the resultant force member.

In each of the embodiments, the configuration of the speed reducer 38 can be freely changed. For example, the speed reducer 38 can be configured from only two gears.

In each of the embodiments, the speed reducer 38 can be omitted as well.

In each of the embodiments, the resultant force member can be formed of the crankshaft 12. In this case, the resultant force member 40 is omitted and the rotation of the speed reducer 38 is transmitted to the crankshaft 12.

In each of the embodiments, the second clutch 28 can be omitted.

In each of the embodiments, the transmission 50 can be configured to be coupled with the end of the resultant force member 40 on the front sprocket 20 side, directly or via the speed reducer 38 with respect to the first direction. In this case, the torque sensor 82 is provided between the connecting portion of the resultant force member 40 and the crankshaft 12 and the end of the resultant force member 40 on the front sprocket 20 side. The torque sensor 82 is able to detect only the manual drive force even if the motor 34 is driving. When transmitting the rotation of the transmission 50 to the end of the resultant force member 40 on the front sprocket 20 side, for example in the drive unit 30 shown in FIG. 2, the positions of the motor 34 and the speed reducer 38 should be switched.

In the third embodiment, the ring gear is fixed and rotation is output from the sun gear, but a configuration can be employed in which the sun gear is fixed and rotation is output from the ring gear to the speed reducer 38 as well.

In each of the embodiments, the controller 80 can be provided outside of the housing 32, or be provided on the frame of the electrically assisted bicycle 10.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element, configurations in which the element is indirectly secured to the other element by affixing the element to the intermediate member(s) which in turn are affixed to the other element, and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle drive unit comprising:
   a transmission;
   a motor configured to transmit rotation to the transmission; and
   a resultant force member to which rotation is transmitted from the transmission and to which rotation by a manual drive force is transmitted,
   the transmission comprising a first sun gear, a second sun gear, a first ring gear, a second ring gear, a first planetary gear, a second planetary gear and a third planetary gear, the first, second and third planetary gears being separate individual gears,
   the first planetary gear being engaged with the first sun gear and the first ring gear,
   the second planetary gear being engaged with the second sun gear and the third planetary gear, and
   the third planetary gear being engaged with the second planetary gear and the second ring gear.

2. The bicycle drive unit according to claim 1, wherein the resultant force member is provided around a rotational axis of a crankshaft, and is configured to be rotated around the rotational axis of the crankshaft.

3. The bicycle drive unit according to claim 1, further comprising
   a transmitting member configured to transmit rotation of the motor to the first sun gear and the second sun gear.

4. The bicycle drive unit according to claim 3, wherein the transmitting member further comprises an output shaft of the motor.

5. The bicycle drive unit according to claim 3, wherein the transmission further comprises a first one-way clutch and a second one-way clutch;
   the first one-way clutch is configured to transmit rotation of the transmitting member to the first sun gear while the transmitting member is rotated in a first rotational direction, and uncouple the transmitting member from the first sun gear so as to not transmit rotation of the transmitting member to the first sun gear while the transmitting member is rotated in a second rotational direction that is opposite the first rotational direction; and
   the second one-way clutch is configured to transmit rotation of the transmitting member to the second sun gear while the transmitting member is rotated in the second rotational direction and uncouple the transmitting member from the second sun gear so as to not transmit rotation of the transmitting member to the second sun gear while the transmitting member is rotated in the first rotational direction.

6. The bicycle drive unit according to claim 1, wherein the first sun gear and the second sun gear rotate around a common axis.

7. The bicycle drive unit according to claim 1, wherein the first sun gear and the second sun gear are integrally formed.

8. The bicycle drive unit according to claim 1, wherein a total number of teeth on the first ring gear and a total number of teeth on the second ring gear are equal.

9. The bicycle drive unit according to claim 1, wherein
   a total number of teeth on the first sun gear and a total number of teeth on the second sun gear are equal,
   a total number of teeth on the first planetary gear and a total number of teeth on the second planetary gear are different, and,
   a total number of teeth on the first planetary gear and a total number of teeth on the third planetary gear are different.

10. The bicycle drive unit according to claim 1, wherein the third planetary gear is arranged so that the entirety of the teeth on the third planetary gear mesh with the second ring gear in a direction along a rotational axis of the second sun gear.

11. The bicycle drive unit according to claim 1, wherein the second planetary gear is arranged so that the entirety of the teeth on the secondary planetary gear mesh with the third planetary gear in a direction along a rotational axis of the second sun gear.

12. The bicycle drive unit according to claim 1, wherein the first planetary gear is arranged closer to the motor than the second planetary gear and the third planetary gear with respect to a direction along a rotational axis of the first sun gear.

13. The bicycle drive unit according to claim 1, wherein the transmission further comprises a carrier that rotatably supports the first planetary gear, the second planetary gear and the third planetary gear; and
   the resultant force member is coupled to the carrier.

14. The bicycle drive unit according to claim 1, further comprising
   a housing supporting the transmission, and
   the first ring gear and the second ring gear being non-rotatable with respect to the housing.

15. The bicycle drive unit according to claim 1, further comprising
   a speed reducer configured to reduce a rotational output speed of the transmission and transmit the rotational output speed of the transmission to the resultant force member.

16. The bicycle drive unit according to claim 1, further comprising
   a controller configured to control the motor.

17. The bicycle drive unit according to claim 16, wherein the controller is configured to control the motor according to a manual drive force and a rotational speed of a crank.

18. The bicycle drive unit according to claim 17, wherein the controller is configured to control the motor so that the motor rotates in a first rotational direction while the rotational speed of the crank is less than a prescribed rotational speed, and control the motor so that the motor rotates in a second rotational direction while the rotational speed of the crank is greater than or equal to the prescribed rotational speed.

19. The bicycle drive unit according to claim 3, further comprising
a crankshaft and the resultant force member being provided around a rotational axis of the crankshaft and configured to be rotated around the rotational axis of the crankshaft.

\* \* \* \* \*